United States Patent [19]
Frampton et al.

[11] Patent Number: 4,532,516
[45] Date of Patent: Jul. 30, 1985

[54] CALIBRATOR FOR DISTANCE MEASURING EQUIPMENT

[75] Inventors: Victor A. Frampton, Fishkill; James R. Drake, Yorktown Heights, both of N.Y.; William R. Slump, Glen Rock, N.J.

[73] Assignee: The Singer Company, Little Falls, N.J.

[21] Appl. No.: 435,054

[22] Filed: Oct. 18, 1982

[51] Int. Cl.³ .............................................. G01S 7/40
[52] U.S. Cl. ................................ 343/17.7; 343/6.5 R; 343/7.3
[58] Field of Search ...................... 343/6.5 R, 17.7, 7.3

[56] References Cited
U.S. PATENT DOCUMENTS 2,478,208  8/1949  Rothman et al. .................. 343/17.7
4,162,495  7/1979  Prill .................... 343/5 LS
4,484,194  11/1984  Arvidsson .......................... 343/17.7

OTHER PUBLICATIONS

Prunty, "Automatic Transponder Calibration in DME Ranging Systems", IBM Technical Disclosure Bulletin, vol. 21, No. 2, Jul. (1978), pp. 546–551.

Primary Examiner—Salvatore Cangialosi
Assistant Examiner—K. R. Kaiser
Attorney, Agent, or Firm—Thomas W. Kennedy

[57] ABSTRACT

In distance measuring equipment apparatus which includes an antenna; a transmitter/receiver coupled to the antenna to transmit interrogation pulses and receive responses from a ground station, the pulses being spaced apart, the ground station also transmitting other responses between the responses; and a data processor receiving video and gate signals from the transmitter/receiver and calculating therefrom the distance to the ground station in order to calibrate for receiver and installation delays. The receiving signal, other than when one of the responses is being received, is modulated. The phase of the resulting modulation on the video signal with respect to the phase of modulation at the modulator is detected to determine the receiver and installation delay.

3 Claims, 8 Drawing Figures

DME
INTERROGATION
ENVELOPE

DME
SUPPRESSOR
SIGNAL

DME
RECEIVED
SIGNAL L-BAND

RECEIVED L-BAND
SIGNAL MODULATED
IN CALIBRATION

RANGE GATE
FROM P DME
COMPUTER

CALIBRATOR FOR DISTANCE MEASURING EQUIPMENT

The Government has rights in this invention pursuant to Contract No. N00019-80-C-0121.

BACKGROUND OF THE INVENTION

This invention relates to aircraft navigation, in general, and more particularly to a calibration system for distance measuring equipment (DME) used in aircraft navigation.

One of the types of navigation equipment most commonly used with aircraft is what is known as Tacan. Tacan is a system which is utilized to give both direction and range to a ground station. Although the directional information is very accurate, until recently, the range information, which is obtained by distance measuring equipment or DME, has not been particularly accurate. There have, however, been attempts to make this more accurate. For example, see U.S. Pat. No. 4,162,495, which describes a digital Tacan system which gives increased accuracy. This patent also gives some background on the nature of the Tacan system. Basically, an aircraft system generates pairs of pulses which are received by a ground transponder station which, after a predetermined delay, transmits a response pair of pulses. By measuring the time between the transmission of the pair of pulses and the reception of a pair of pulses, it is possible to determine the distance from the ground transponder. In addition to the pulses from that particular aircraft, there are also transmitted pulses in response to other aircraft and random pulses. The received signal also contains squitter, i.e., noise.

The time delay between transmission of interrogation pulses and reception of response pulses is a summation of installation delay, range delay, transponder delay, and receiver delay. Transponder delay is known and fixed, i.e., the transponder responds a known time after receiving pulses. Range delay is, of course, the delay to be measured to determine range. There remains receiver and installation delay. It is the calibration of these delays which leads to errors. In present state-of-the-art systems, nominal receiver delay calibration is built in. Installation delays, which are small compared to receiver delays, have been neglected. As a result, installation delays are not corrected at all and receiver delays are only approximately corrected. There is no way of adding additional correction for the errors, which result as a function of receiver center frequency, ground station transponder frequency, signal dynamics and temperature effects.

Thus, it is the object of the present invention to provide a calibration system which calibrates for receiver and installation delay in distance measuring equipment to give increased range accuracy measurements.

SUMMARY OF THE INVENTION

The present invention solves this problem by modulating the portion of the received signal other than the pair of response pulses, feeding the modulated signal to the Tacan receiver and then utilizing the video signal developed in the Tacan receiver to synchronously detect and measure the delay through the receiver. A calibration signal is then provided which can be used in the DME computer to correct for the receiver and installation delays.

Thus, in general, the present invention includes, in a coupler and calibrator unit, switches for switching a transmitted signal directly therethrough or switching a received signal through a modulator. It also includes an oscillator for generating a modulation signal to be impressed on the received signal. Finally, there are provided circuits to take the video signal and, in a phase detector, detect or demodulate that signal and generate a signal proportional to the delays through the receiver. This signal is then integrated in an integrator, the DC output of which will be proportional to the delay. Through feedback, this delay is fed to the phase detector so as to bring it into quadature with the incoming signal. The integrator output is then converted into a pulse signal, the length of which is proportional to delay.

DETAILED DESCRIPTION

Figure 1:
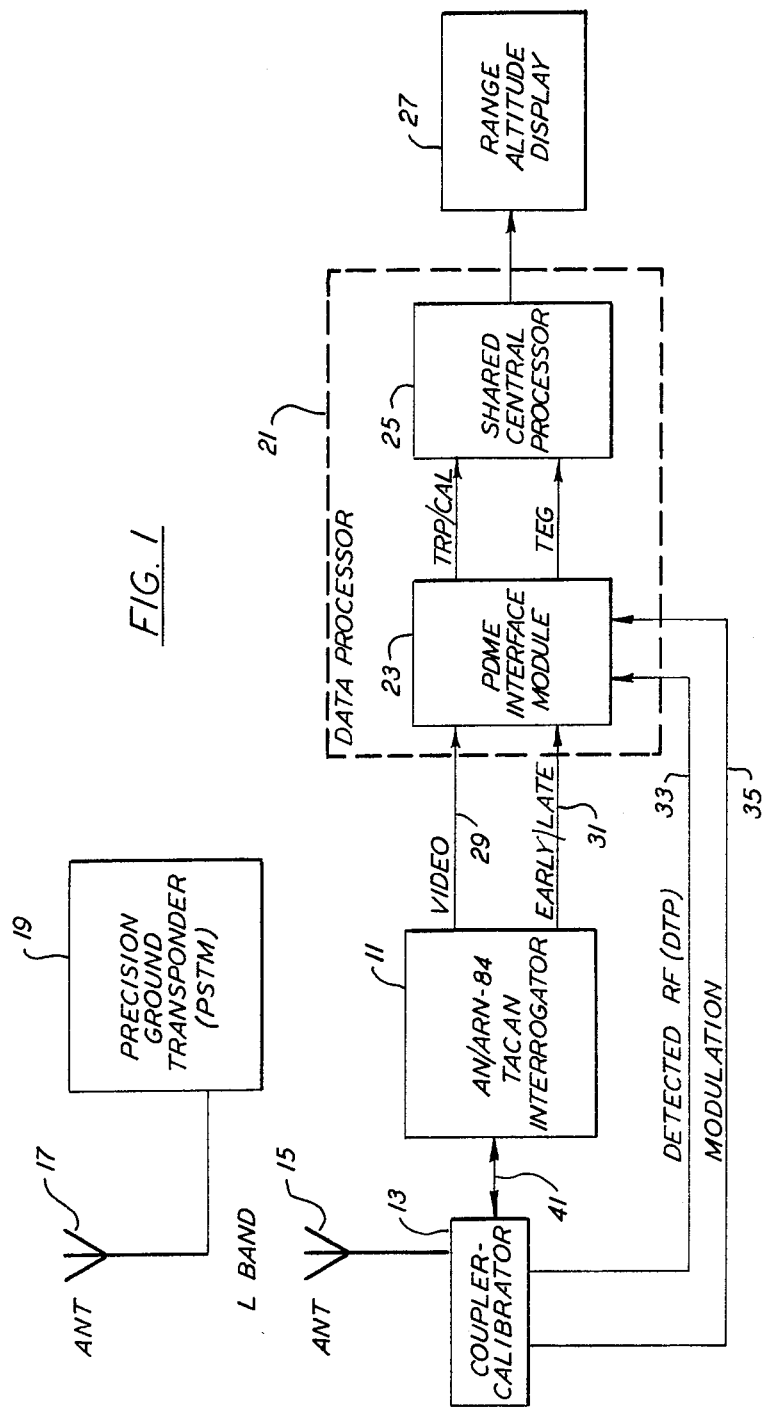
FIG. 1 is a block diagram of the overall system of the present invention.

FIG. 1 is an overall block diagram of the system of the present invention. A conventional, for example, AN/ARN-84 Tacan interrogator 11 provides signals to a coupler-calibrator 13 from which they are supplied to an antenna 15. These signals are received by a ground station antenna 17 and coupled into a ground station transponder 19 which, after a predetermined delay, transmits response pulses. These response pulses are received by the antenna 15 and coupled through the coupler calibrator 13 back to the Tacan interrogator 11. In Tacan interrogator 11, a video signal and an early/late gate is developed which is supplied to a data processor 21 having an interface module 23 and a shared central processor 25. The output from central processor 25 is provided to a range altitude display 27. The Tacan interrogator 11 develops, from the incoming responses, the video signal on line 29 and the early late gate on line 31 which is used in the interface module 23 to generate accurate range information. For a more detailed explanation of this part of the system, reference can be had to the aforementioned U.S. Pat. No. 4,162,495. In addition, the interface module 23 receives a detected RF signal on line 33. The nature of this signal is also explained in the aforementioned patent. The new signals not present in prior art systems is the modulation signal on line 35. Also new is a calibration signal on line 41 which it is the function of the present invention to provide. Line 41 is actually a number of lines and is shown as being bidirectional. It includes the calibration pulse which is supplied by the calibration system, but it also includes certain signals which must be provided from the Tacan interrogator or the interface module 23 to the calibration system of the present invention as will be seen below.

Figure 2:
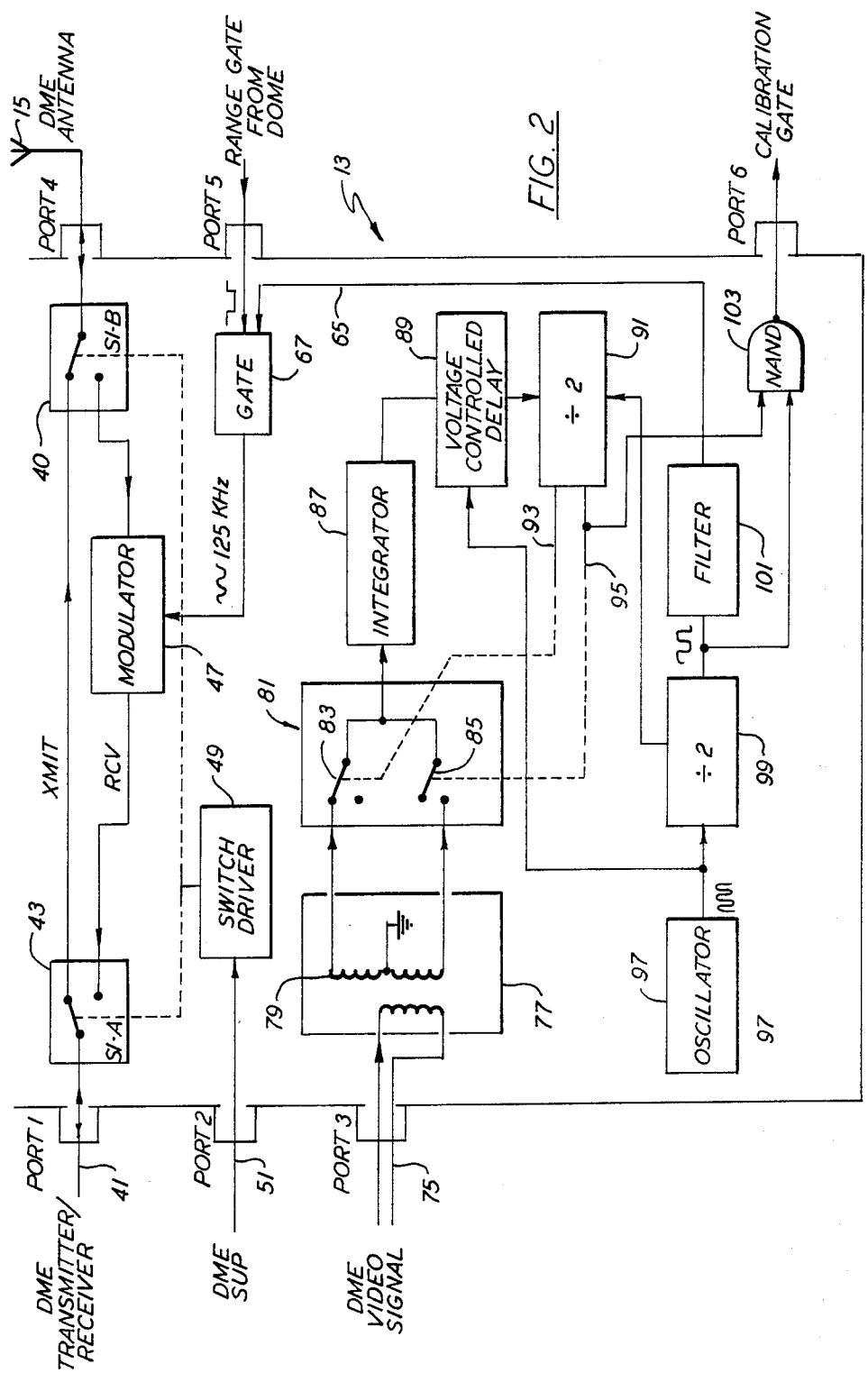
FIG. 2 is a block/circuit diagram of the calibration system of the present invention.

The transmit or receive pulse from and to the Tacan interrogator 11 is coupled over line 41 which is an input to a first port of the coupler/calibrator 13 shown in FIG. 2. This line is coupled through a switch 43 and switch 40 to the antenna 15. During transmitting the switches are in the position shown and a direct connection through the system of the present invention to the antenna takes place. When an incoming signal is being received, the signal is coupled by the switches 43 and 40 through a modulator 47. The switches 43 and 40 are driven by a switch driver 49 which receives an input on line 51, this input being the DME suppressor signal. With reference to FIGS. 4A-E, the pairs of DME integrator pulses 55 are shown. Also shown are the DME suppressor signals 57. The interrogation pulses are generally approximately $3.5 \times 10^{-6}$ second long with the time between pairs of pulses typically $33 \times 10^{-3}$ seconds. The suppressor signals 57 begin prior to each interrogation pulse and end after the interrogation pulse. Thus, the switches 43 and 45 are thrown into the transmit position for the full duration of the transmission of the interrogation pulses.

Figure 4A:
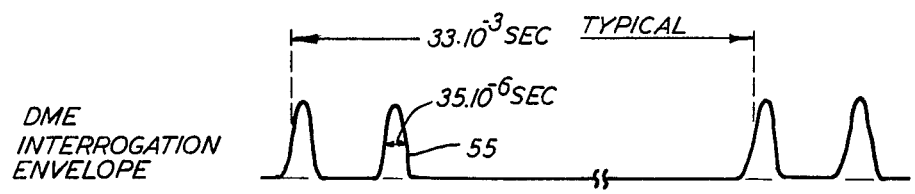
FIGS. 4A-E are timing diagrams illustrating the various pulses in the system.
Figure 4B:
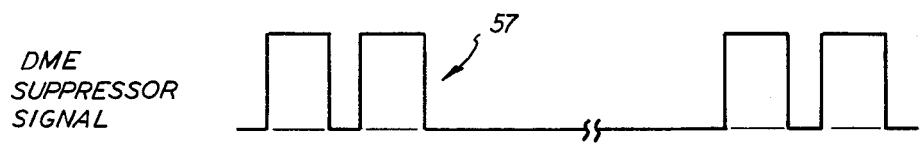
Figure 4C:
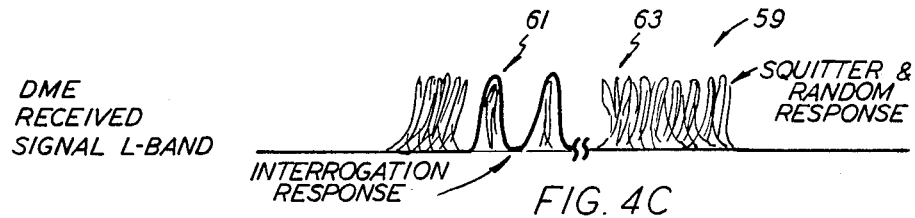

The nature of the response signal is also shown as the signal 59 of FIG. 4C. There, the interrogation responses 61 are visible as is, on both sides of the response pulses squitter and random responses 63. This signal is modulated in the modulator 47 by a signal at approximately 125 kHz. Only the portion of the signal outside the interrogation response is modulated. To accomplish this, the modulation signal on line 65 is passed through a gate 67 which has its enabling input a range gate signal. The range gate signal is illustrated as waveform 69 of FIG. 4E. All of the received signal but the responses 61 is modulated to provide a modulated signal 71 as illustrated by the wave form 73 of FIG. 4D. The modulated signal, after being coupled through the Tacan interrogator 11, is provided back to the calibrator unit 13 as video signal on a line 75 which is an input to a transformer 77 having a center tapped secondary 79. The output of the secondary is coupled into a switching unit 81 which includes a switch 83 and a switch 85. The switch outputs are provided into an integrator 87. The switching unit 81 is, in effect, a phase detector, the operation of which will be seen in more detail below. The difference in phase between the modulated signal and the video signal fed back is determined and this delay, corresponding to the receiver and installation delay is stored in the integrator 87. The output of the integrator 87 is provided to a voltage controlled delay 89, which controls a divide by 2 circuit 91 which provides the switching control for the switches 83 and 85.

Basically, the signals on lines 93 and 95 controlling the switches 83 and 85 are 180 degrees out of phase. The control is such as to bring these signals into quadature with the signals out of the secondary 79 of the transformer, which signals on the two legs of the secondary will also be 180 degrees out of phase. An oscillator 97 operates at twice the modulation frequency and provides a clock input to the voltage control delay 89, the output of which controls the divide by 2 circuit 91. The output of oscillator 97 is also provided as an input to another divide by 2 stage 99, the output of which is filtered in a filter 101 to provide the sine wave modulating signal on line 65. The output of the divide by 2 stage 99 is also an input to Nand gate 103 having as its second input the output on line 95 from the divide by 2 stage 91. The output of Nand gate 103 is a pulse, the width of which is proportional to the receiver and installaion delay.

Figure 3:
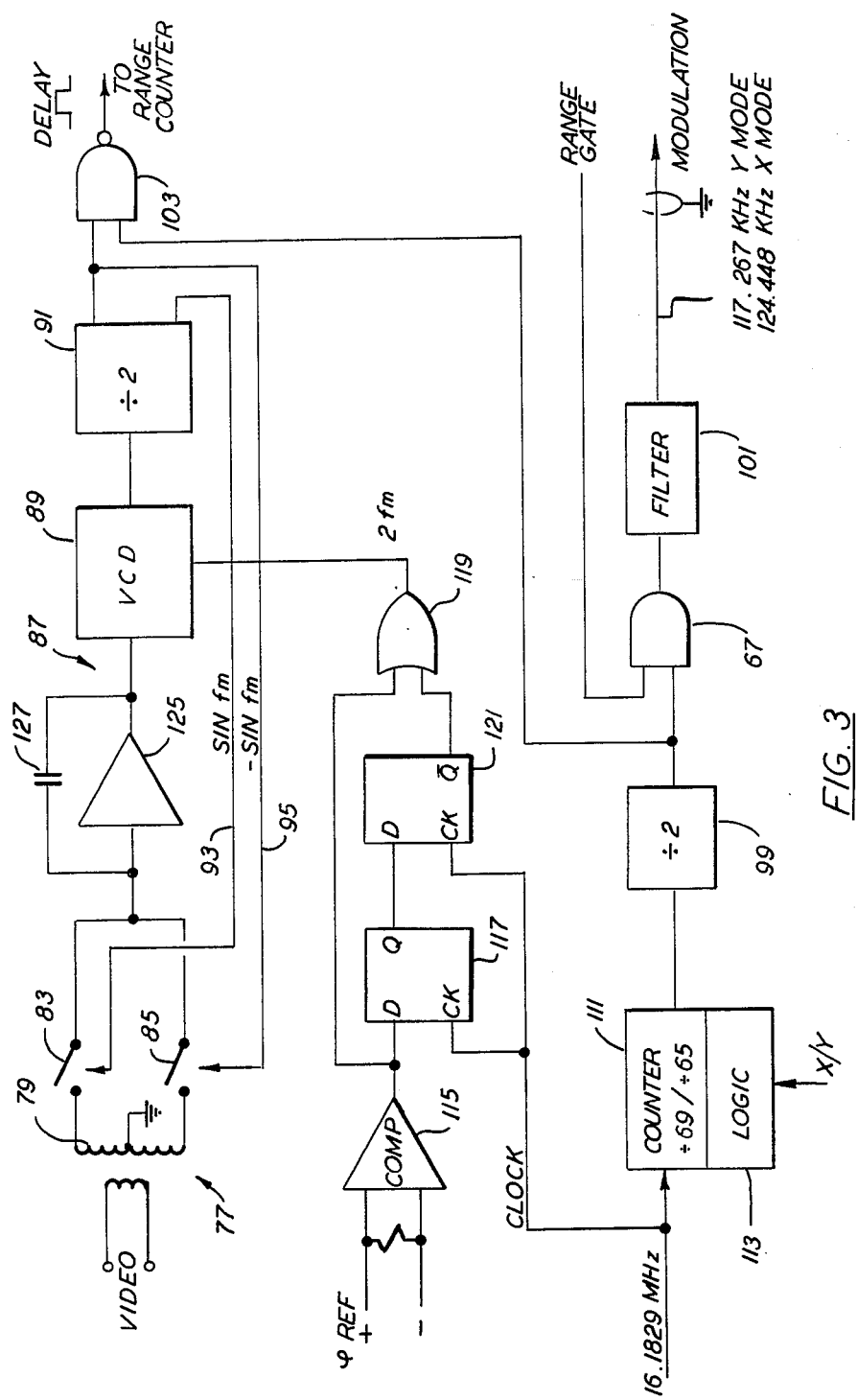
FIG. 3 is a more detailed circuit/logic diagram of a portion of the system of the present invention.

FIG. 3 is a more detailed diagram of the logic associated with the phase detector 81 and the modulator 47. The instrumentation shown in FIG. 3 shows details relating to signals provided by the present PDME computer 21. This configuration also shows the circuit configuration for the delay measurement being instrumented remote from the L-Band circuitry of the coupler-calibrator 13.

As illustrated, an input at 16.1829 mHz, a clock frequency in the system, is provided into a divide by 69 or divide by 65 counter 111 controlled by logic 113 in conventional fashion depending on whether the Tacan system is operating in the X mode or Y mode. This will result in a signal of either approximately 117 or 124 kHz after being divide by 2 in a divide by 2 counter 99, i.e., a flip-flop. This signal, coupled through a gate corresponding to gate 67 and filter 101, provides the modulation signal which is the input to the modulator. In this embodiment, the gate 67 is installed before the filter 101. However, the other arrangement shown in FIG. 2 is equally valid. The modulation frequency is fed back into a comparator 115, which converts the sine wave back to a square wave. The output of comparator 115 is the input to a D-type flip-flop 117 and also fed directly into an OR gate 119. The clock input for the D-type flip-flop is provided from the 16.1829 mHz clock. The Q outut of D-type flip-flop 117 is an input to another D-type flip-flop 121, the Q output of this flip-flop being the second input to OR gate 119. This provides a synchronizaton such that the divide by 2 circuit 99 always leads the divide by 2 circuit 91 shown in the upper portion of FIG. 3. Shown, once again, is the transformer 77 with its secondary 79 and the switches 83 and 85 which make up the phase detector 81. Again, the control signals 93 and 95 are provided from the divide by 2 counter 91. The input to the divide by 2 counter is the output of gate 119 delayed through a voltage control delay 89.

As illustrated, integrator 87 comprises an amplifier 125 with a capacitor 127 in its feedback path. Essentially, integrator 87 integrates up and down until it reaches a level at which the delay caused by the voltage control delay 89 is just such that the signals on lines 93 and 95 are in quadature with the signals through the switches 83 and 85, i.e, the signals on the two legs of the secondary. The feedback signal includes the variation in phase and through this feedback, it becomes possible to reach quadature between the two signals to in effect cancel them out so that the input to the integrator is zero. Thus, the integrator will integrate up or down until its output is proportional to the variation in phase. At that point the signals will be quadature and the net input to the integrator will be zero. The integrator signal then is provided as the delay for the signal at 2 fm from the OR gate 119 into the divide by 2 module 91. In Nand gate 103, one of the outputs of the divide by 2 circuit 91 and the output of divide by 2 circuit 99 are combined. The divide by 2 circuit 99 will determine the rising edge of the output pulse, and the divide by 2 circuit 91 the falling edge. Thus, with zero delay, one will have a 50 percent duty cycle. As a delay increases the pulse becomes shorter and shorter, the pulse length, thus, being proportional to the delay. This information can then be used by the data processor 21 of FIG. 1 to correct for the installation and receiver delay.

The capability of calibrating installation as well as receiver delays, requires that the detected RF line 33 length between the airborne DME, i.e., unit 11 and the calibrator i.e., unit 13 be the same length as the modulation line 35 between the same two units and the transmission length between the DME antenna 15 and the calibrator 13 be short. The range measurement contains twice the one-way delay of the L-band line. The calibration measurement contains the delay contribution of the one-way delay of the video signal line and the one-way delay of the detected RF line 33. Proper termination of the two transmission lines between the DME and the calibrator is required for accurate calibration and compensation. This is a reasonable requirement for installation and equipment design.

Thus, with the calibration system of the present invention, the range measurement accuracy of present DME and Tacan airborne subsystems can be improved. It should be noted that the L-band circuitry within the calibrator can be implemented using discrete L-band components or state-of-the-art integrated stripline circuitry. In addition, the function of switches 43 and 44 of FIG. 2 can be replaced by ferrite circulators which can provide the required isolation between the Tacan transmitter and received signals without using the Tacan suppressor signal. The L-band circuitry in FIG. 2 can be implemented using discrete L-band components or state-of-the-art integrated stripline circuitry. It should be noted, also, that the circuits 81, 87, 89 and 91 essentially comprise a phase locked loop. This circuit can be implemented either in analog fashion or with a combination of digital and analog circuits.

Figure 4D:
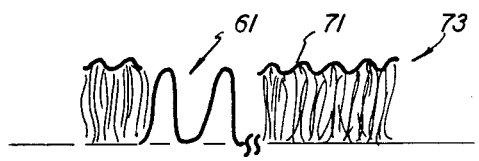
Figure 4E:
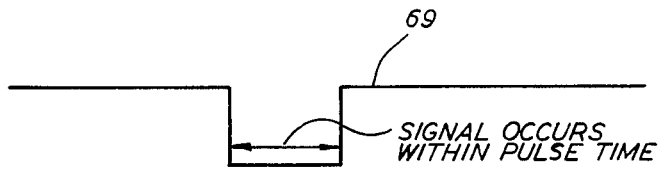

It is further noted that the novel structure of this invention is functional because the 2700 pps squitter, being random and broadband, supports the 124 Khz and 117 Khz modulations. This is shown in FIG. 4D in waveform 71.

What is claimed is:

1. In distance measuring equipment apparatus which includes:
   (a) an antenna;
   (b) a transmitter/receiver coupled to said antenna to transmit interrogation pulses and receive responses from a ground station, the pulses being spaced apart, the ground stations also transmitting other responses between said responses; and
   (c) a data processor receiving video and gate signals from said transmitter/receiver and calculating therefrom the distance to the ground station, a method of calibrating for recovery and installation delays comprising: modulating, at a position close to the antenna, the received signal other than when one of said responses is being received and detecting the phase of the resulting modulation on the video signal with respect to the phase of modulation at the modulator to determine the receiver and installation delay; and
   wherein said step of modulating comprises dividing a square wave to obtain a wave at the desired modulation frequency; filtering said square wave at the desired modulation frequency; filtering said square wave to obtain a sine wave; applying said sine wave to the received signal in a modulator; blocking modulation in response to a range gate signal developed in said transmitter receiver during the time for receiving response pulses; and utilizing said square wave to detect the phase of said video signal; and
   wherein said method includes coupling said square wave through a voltage controlled delay; developing a pair of square wave signals which are 180 degrees out of phase from said delayed square wave; developing from the video signal, two video signals which are 180 degrees out of phase; and switching said two video signals to an integrator under control of said pair of square wave signals; integrating said video signals; and utilizing the integrated result as a control signal for said voltage control delay, said delay thereby being representative of the phase difference, and further including developing a pulse having a width proportional to said delay from the output of said voltage controlled delay and said square wave.

2. In distance measuring equipment apparatus which includes:
   (a) an antenna;
   (b) a transmitter/receiver coupled to said antenna to transmit interrogation pulses and receive responses from a ground station, the pulses being spaced apart, the ground station transmitting other responses between said responses; and
   (c) a data processor receiving video and gate signals from said transmitter/receiver and calculating therefrom the distance to the ground station, means for calibrating for receiver installation delays comprising:
   (d) means for modulating, at a position close to the antenna, the received signal other than when a response from the transmitter is being received; and
   (e) means for detecting the phase of the video signal with respect to the phase of modulation at the modulator to determine the receiver and installation delay; and
   wherein said transmitter develops a suppression signal during transmission of pulses and wherein said means for modulating include: a modulator; a first single pole double throw switch having its common contact coupled to the antenna, a second single pole double throw switch, having its common contact coupled to said transmitter/receiver, first contacts of said first and second switches coupled to each other directly and the second contacts of said first and second switches coupled to each other through said modulator, mean having said suppression signal as an input for placing said switches in said first position during said suppression signal; and means for coupling a modulation frequency into said modulator at all times other than when response pulses should be received from the ground station; and
   wherein said means for coupling said modulation signal comprise: means developing a modulation signal; and a gate receiving an enable signal from the range gate signal in said transmitter/receiver coupling the output of said means developing to said modulator; and
   wherein said means developing a modulating signal comprise:
   (a) an oscillator;
   (b) a first divide by 2 counter receiving an output from said oscillator; and
   (c) a filter for filtering the output of said divide by 2 counter to convert it into a sine wave, said sine wave coupled as the input to said modulator; and
   wherein said means for detecting comprise:
   (a) an integrator;
   (b) a voltage controlled delay receiving an input from said oscillator and a delay input from said integrator;
   (c) a second divide by 2 counter receiving an input from said voltage controlled delay, said divide by 2 counter providing first and second outputs 180 degrees out of phase with each other;

(d) a transformer having a center tapped secondary and a primary, said video signal coupled to the primary, said secondary developing, on its respective two sides, output video signals 180 degrees out of phase with each other; and (e) first and second switches respectively coupling said two sides of said transformer to said integrator, said switches coupled to be controlled by the outputs of said second divide by 2 counter.

3. Apparatus according to claim 2 and further including a gate for developing a pulse proportional to phase difference and thus to delay having as one input an output from said first divide by 2 counter and as a second input and output from said second divide by 2 counter, the output of said first divide by 2 counter establishing the rising edge of said pulse and the output of said second divide by 2 counter the falling edge of said pulse, whereby the width of said pulse will be proportional to the delay being measured.

* * * * *